Feb. 9, 1926.

O. D. GRAY 1,572,601

FRICTION MATERIAL

Filed April 9, 1923      2 Sheets-Sheet 1

Inventor:
Orrin D. Gray,
by Banning & Banning, Attys.

Feb. 9, 1926.
O. D. GRAY
FRICTION MATERIAL
Filed April 9, 1923    2 Sheets-Sheet 2
1,572,601
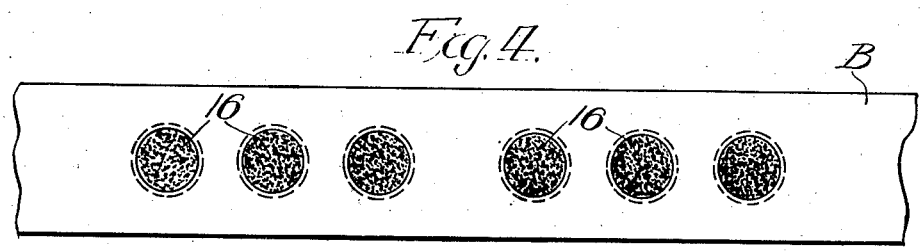
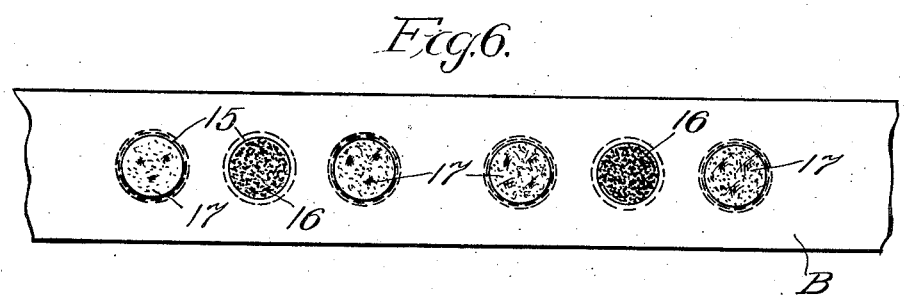
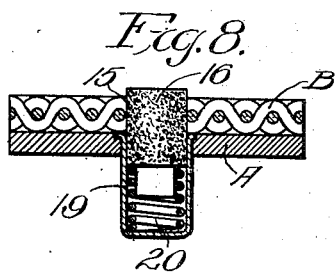
Inventor:
Orrin D. Gray,
by Fleming & Fleming, Attys.

Patented Feb. 9, 1926.

1,572,601

UNITED STATES PATENT OFFICE.

ORRIN D. GRAY, OF CHICAGO, ILLINOIS, ASSIGNOR TO ADVANCE AUTOMOBILE ACCESSORIES CORPORATION, OF CHICAGO, ILLINOIS, A CORPORATION OF DELAWARE.

FRICTION MATERIAL.

Application filed April 9, 1923. Serial No. 630,714.

*To all whom it may concern:*

Be it known that I, ORRIN D. GRAY, a citizen of the United States, residing at Chicago, in the county of Cook and State of Illinois, have invented certain new and useful Improvements in a Friction Material, of which the following is a specification.

This invention relates to a material having suitable frictional properties, and more particularly to the association with such a material of a lubricating means for resisting the destructive effects of heat, wear, etc.

It is possible to embody my invention in numerous forms and to employ in connection therewith any one of several frictional materials, provided that it be endowed with the requisite properties for this purpose. As a suggestive embodiment of the invention, the description to follow will deal with a woven material of fabric which, by preference, is specially treated with pitches, stearines, oils, or otherwise, so as to enhance its toughness and durability. With a material of this general character, I associate a relatively hardened lubricating element such as graphite, mica tallow, or grease. The product so made may be applied advantageously to any of the common frictional uses such, for example, as the braking mechanism of an automobile which is equipped with a planetary transmission.

Referring to the drawings:

Figs. 3 and 4 are longitudinal sections and plan views, respectively, of one form of lining which embodies this invention;

Figs. 5 and 6 are similar views of another form of lining embodying this invention;

Fig. 7 is an enlarged detail, in longitudinal section, of a further modification of this invention; and Fig. 8 is a transverse section through a lining and associated band which represents a still further modification of this invention.

Figure 1:
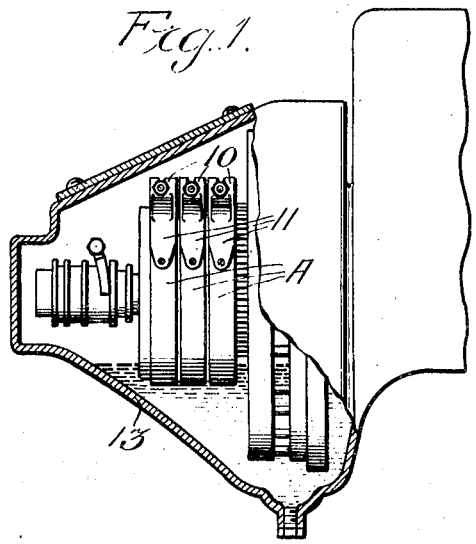
Figure 1 is a transverse section through a housing containing a planetary transmission, the view exhibiting an oil reservoir, as well as three bands each of which is lined on its inner face with a friction material.
Figure 2:
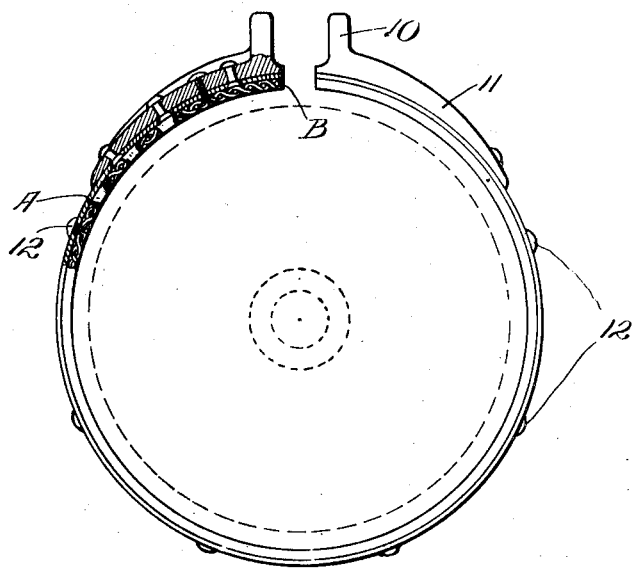
Fig. 2 is an elevation of an edge of one band detached from its associated mechanism, a lining being shown upon its inner face; a portion of the figure is also broken away to better exhibit the parts in longitudinal section.

Referring now particularly to Figs. 1 and 2, I have illustrated certain parts of a transmission in which is included a band A in the form of a split ring to the ends of which are secured upstanding slotted lugs 10 each equipped with a foot 11, bolted or otherwise made fast to the band. These parts of the band are intended to co-operate with other elements (not shown) which act to tighten the band against a drum, or the like, when friction is to be applied thereto. To the inner side of the band is secured a friction lining B which may be attached in place by any suitable means, such as rivets 12. The split band, best shown in Fig. 2, may be arranged operatively with respect to a clutch, brake, or the like, and its associated parts the entire mechanism being contained within a housing 13, as illustrated in Fig. 1, wherein is provided a reservior for oil, the level of which is kept at the desired point. When the mechanism is in operation, certain of the parts are revolved through the oil which is thereby carried up in the form of a sheet around the sides of the casing by which action the entire mechanism is treated to a bath or spray of oil. In this manner the oil reaches practically all parts of the mechanism, except upon the inner face of the lining where the maximum friction obtains, and where burning or charring is most likely to occur. The treatment which is commonly accorded to linings to adapt them for use in the environment just set forth is calculated also to render the material relatively impervious to oil. Not only is the texture of the fabric sufficiently close to resist any passage of oil through the lining, but the application thereto of pitches, oils, stearines, etc., such as are necessary to render the lining serviceable over a considerable period of years, has the effect of still further closing its pores and interstices. For reasons such as these, the passage of oil through to the wearing surface of the lining is blocked. Efforts have heretofore been made to provide for lubricating the wearing face of a friction lining as by the formation of holes therethrough, but such an expedient is only moderately successful, due, in part, to the fact that the oil is taken from the supply contained within the transmission housing, the lubricating value of which diminishes with continued operation of the parts associated therewith. For this reason it is apparent that no lubrication which depends upon the source of oil supply contained within such a housing, can be constant or uniform in value over any considerable period of operation.

According to this invention, I provide in the material composing the lining a plurality of openings or pockets 15 in each of which is received a lubricating element 16. By preference each such element is in the general form of a disk having a relatively hard or solid constituency. It may be formed with graphite as one ingredient, and if its peripheral edges be tapered as shown, the disk will remain in place within the lining as long as its broader side remains backed against the band. A plurality of such lubricating inserts are preferably arranged within the lining material, in groups of three, as shown, or otherwise, according as may be found desirable. The construction just described is clearly set forth in Figs. 3 and 4.

A modification of this arrangement is illustrated in Figs. 5 and 6. In this construction, the lining B is duplex in character, in that it is associated with a backing C of felt or other suitable material which is both porous and yielding. The lining is shown as formed with a plurality of holes 15 wherein are contained lubricating inserts 16, in some instances, and, in other instances, frictional inserts 17 of cork or other appropriate material. All of the inserts so carried in the lining are shown as presenting their rear sides to the felt backing. It may be preferred to have the wearing faces of the frictional inserts exposed slightly beyond the wearing face of the lining, but this is merely optional. In such a construction, the first pressure would be received by the frictional inserts, which are, to a certain degree yieldable, and with an increase of pressure, these inserts will be compressed to the point where the entire wearing surface of the frictional material, including the lubricating inserts, is in engagement with the rotating surface to which friction is being applied. This construction possesses the advantage of supplying lubrication only after pressure to a measurable degree has first been exerted by the friction material, or certain of its components, but not before.

In Fig. 7, the lining B is shown as provided with a lubricating insert 16, the rear face of which bears against a disk 18 of felt, or other suitable material. The lubricating insert which is relatively hard in constituency is not yieldable in and of itself, but when associated with a felt backing either in the form of a disk, or otherwise, may to a slight extent recede if the pressure of the frictional material upon the working surface be sufficiently great. This construction may be used with or without other associated frictional inserts such as are shown in Figs. 5 and 6, and the protrusion of the inserts relative to each other, as well as to the lining, may be determined according as is found desirable.

The construction of Fig. 8 makes use of a lining B of friction material similar to that already described, this lining being secured adjacent a band A in which are mounted a plurality of cups 19 which, if extended beyond the band side, lie preferably to the side thereof which is remote from the lining. These cups are each adapted to contain a spring 20 bearing against a lubricating disk or plug 16 which is disposed within an opening 15 formed in the lining, as shown. With such an arrangement the lubricating element is maintained under a slight pressure at all times in a forward position; that is, it tends to protrude beyond the wearing face of the lining to engage with the surface whereon friction is applied. The action of such an insert is quite comparable to that described in connection with Fig. 7, in that the lubricating element is maintained yieldingly in place, but by the use of means which are associated directly with the band, I am able to employ a lubricating element of greater size and with capacity for greater movement.

In connection with the construction last described, it is to be noted that the lubricating elements are engaged with the moving part to which it is desired that friction should be applied, and that such engagement precedes that of the material which applies the friction. This is of special advantage in that the surface of the moving part is pre-treated with the lubricant so as to better adapt the frictional material to function without excess of wear and heat. Under these conditions the friction applied is more nearly uniform in value, and tends to produce a coefficient of friction which is gradual rather than abrupt as the speed of the moving part is retarded.

The different forms suggested for my invention in Figs. 3 to 8 inclusive are merely typical of several. In each instance, it will be noted that the wearing face of the material is composed in part of inserts having a lubricating value such as to resist burning or charring of the kind which ordinarily results in a premature destruction of the lining. For these reasons a friction lining which is so constructed will not only be serviceable over a greater period of time, but due to the fact that its serviceable condition is preserved over a long period of time, it will continue to function more satisfactorily and with less noise and chatter than would otherwise be the case.

I claim:

1. A frictional material wherein are formed a plurality of openings, a solidified lubricating element contained within each opening, and yielding means positioned rearwardly of each lubricating element, substantially as described.

2. A frictional material wherein are formed openings, a lubricating element positioned within each opening, and resilient means rearwardly of each element adapted to project the same beyond the wearing face of the frictional material, substantially as described.

3. A frictional material wherein are formed openings, an insert of solidified lubricating material contained in each opening, and yielding means positioned rearwardly of each insert adapted to project its acting end beyond the wearing face of the frictional material, substantially as described.

ORRIN D. GRAY.